United States Patent [19]

Abendschein et al.

[11] Patent Number: 4,795,229

[45] Date of Patent: Jan. 3, 1989

[54] STRAIN RELIEF ASSEMBLY FOR OPTICAL FIBER CONNECTOR

[75] Inventors: Frederic H. Abendschein, Columbia; Paul B. Derr, Middletown; John H. Huber, Harrisburg, all of Pa.

[73] Assignee: AMP Incorporated, Harrisburg, Pa.

[21] Appl. No.: 47,227

[22] Filed: May 7, 1987

[51] Int. Cl.$^{4}$ .................................................. G02B 6/36
[52] U.S. Cl. ................................. 350/96.20; 350/96.23
[58] Field of Search ............... 350/96.20, 96.21, 96.22, 350/96.23

[56] References Cited

U.S. PATENT DOCUMENTS

| | | | |
|---|---|---|---|
| 3,986,765 | 10/1976 | Shaffer et al. | 339/90 R |
| 4,279,466 | 7/1981 | Makuch et al. | 350/96.21 |
| 4,336,977 | 6/1982 | Monaghan et al. | 350/96.20 |
| 4,588,256 | 5/1986 | Onstott et al. | 350/96.21 |
| 4,676,589 | 6/1987 | Miyashita et al. | 350/96.21 |
| 4,679,895 | 7/1987 | Huber | 350/96.20 |

FOREIGN PATENT DOCUMENTS

| | | | |
|---|---|---|---|
| 0199267 | 10/1986 | European Pat. Off. | 350/961.21 |

*Primary Examiner*—John Lee

[57] ABSTRACT

A connector for an optical fiber cable includes a strain relief structure provided with a first annular retention member (16) having a first bearing surface (51*c*) cooperating with a jacket retention portion (63) of an annular retention sleeve (18) for retaining the outer jacket (33) of the cable (25), and a second bearing surface (44) of an annular retention member (17) cooperating with a strengthening layer retention portion (61) of an annular retention sleeve (18) for retaining the inner strengthening layer (33) of the cable.

7 Claims, 2 Drawing Sheets

STRAIN RELIEF ASSEMBLY FOR OPTICAL FIBER CONNECTOR

FIELD OF THE INVENTION

The present invention relates generally to optical fiber connectors and, more particularly, to a strain relief assembly for optical fiber connectors.

BACKGROUND OF THE INVENTION

Optical fiber connectors connect optical fibers in end-to-end relationship so that light can be transmitted from one fiber to another. A connector typically includes structure for securing the ends of one or more fibers rigidly in position within the connector so that the fibers will be properly aligned with fibers in a complementary connector when the connectors are mated.

Optical fibers are often carried within optical fiber cables comprised of a plurality of layers of material to protect the optical fibers therein. For example, a typical optical fiber cable includes an outer cover or jacket of strong flexible plastic or the like and an inner strengthening layer consisting of a large number of very fine threads.

To protect the individual fibers and their attachments in the connector, it is known to provide strain relief apparatus to isolate the individual fiber attachments from external forces. Known strain relief apparatus generally comprised structure for clamping the connector to the outer jacket of the cable at positions behind the fiber attachments to the connector to prevent external stresses from reaching the fiber attachments.

Many known optical fiber cable strain relief apparatus were complex in construction and required the use of specialized tools for assembly. In addition, many known apparatus were usable with only one or a limited number of cable sizes and could not reliably provide strain relief for cables carrying diverse numbers of optical fibers as well as cables carrying both optical fibers and electrical conductor wires.

SUMMARY OF THE INVENTION

The present invention provides an optical fiber connector for optical fiber cables which include an outer jacket, an inner strengthening layer, and one or more optical fibers carried within the strengthening layer. The connector according to the invention includes strain relief structure for the one or more optical fibers which comprises a first annular retention member having a first bearing surface, a second annular retention member having a second bearing surface, and an annular retention sleeve having a jacket retention portion and a strengthening layer retention portion. The first bearing surface of the first annular retention member cooperates with the jacket retention portion of the annular retention sleeve for retaining the jacket of the cable, and the second bearing surface of the second annular retention member cooperates with the strengthening layer retention portion of the annular retention sleeve for retaining the strengthening layer of the cable.

In accordance with a presently preferred embodiment, the jacket retention portion of the annular sleeve comprises a plurality of inwardly extending finger elements, and the strengthening layer retention portion of the retention sleeve comprises a tapered sleeve portion. The first and second annular retention members include connecting means for connecting the retention members together with the annular retention sleeve positioned therebetween. When the retention members are connected, the first bearing surface on the first annular retention member urges the finger elements inwardly into engagement with the cable jacket, and the second bearing surface on the second retention member cooperates with the tapered sleeve portion to squeeze and secure the strengthening layer therebetween. With the present invention, therefore, both the outer jacket and the strengthening layer of the optical fiber cable are separately and substantially simultaneously attached to the connector by the strain relief structure to secure the cable to the connector and provide reliable strain relief for the optical fiber attachments in the connector.

According to a further aspect of the invention, the first and second annular retention members and the annular retention sleeve comprise a strain relief assembly adapted to be connected to the rear end of an optical fiber connector to provide the connector with strain relief capability without completely re-designing the connector. The components of the strain relief assembly can be assembled together and the assembly attached to the connector body by relatively unskilled personnel without special tools.

Further advantages and specific details of the invention will become apparent hereinafter in conjunction with the following detailed description of a presently preferred embodiment.

DETAILED DESCRIPTION OF THE PREFERRED EMBODIMENT

Figure 1:
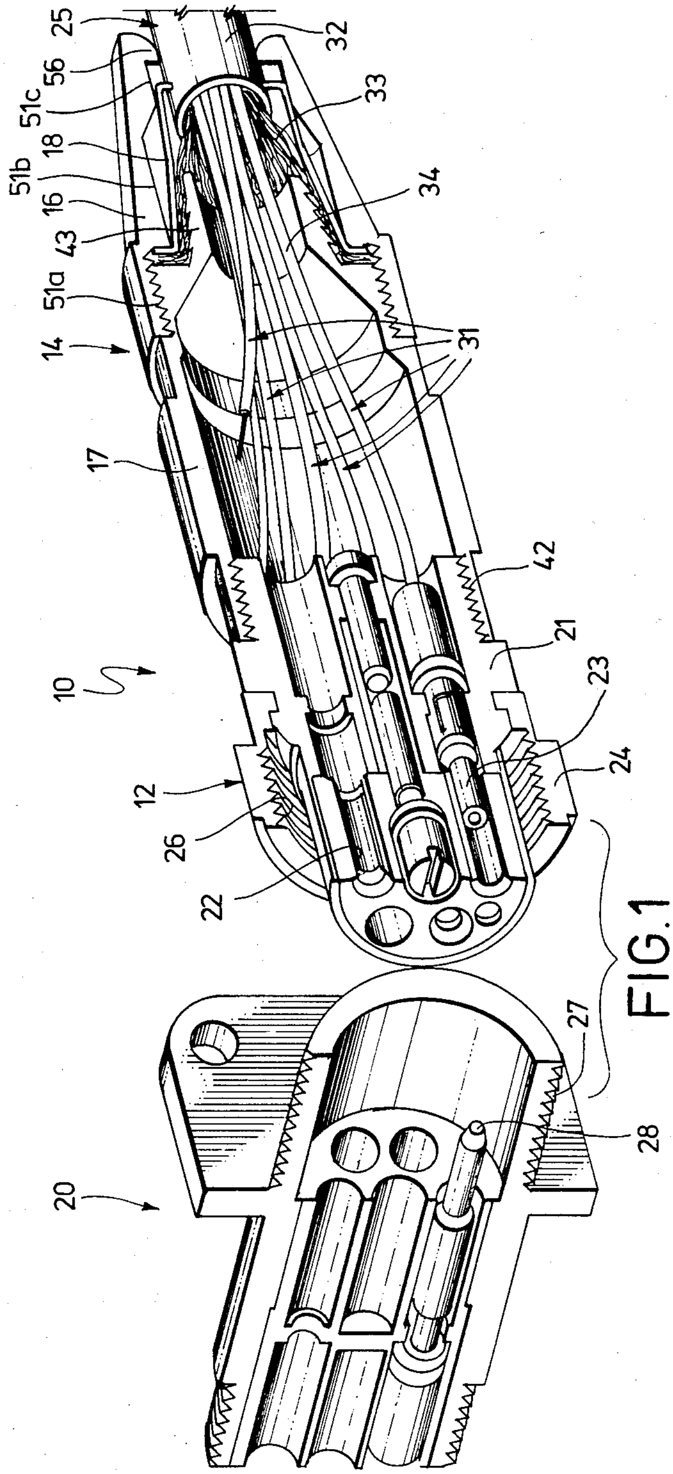
FIG. 1 is a cross-sectional, perspective view of an optical fiber connector according to a presently preferred embodiment of the invention and a complementary connector therefor.

FIG. 1 illustrates an optical fiber connector according to a presently preferred embodiment of the invention. The connector is generally designated by reference numeral 10 and comprises a connector body portion 12 and a strain relief portion 14. Connector 10 is adapted to be attached to the end of an optical fiber cable 25 to support a plurality of optical fibers 31 within the cable in positions to mate with optical fibers 28 in a complementary optical connector 20.

Connector body portion 12 comprises a generally cylindrical housing 21 having a plurality of longitudinal passageways 22 for receiving and supporting a plurality of termination members 23 which terminate the individual optical fibers 31 within cable 25. Connector body portion 12 further includes a rotatable sleeve 24 which has an internally threaded surface at 26 adapted to mate with externally threaded surface 27 on complementary connector 20 to attach connectors 10 and 20 to one another and to optically connect of optical fibers 31 in connector 10 with optical fibers 28 in complementary connector 20. Connector body portion 12 also includes an externally threaded surface portion 42 adjacent the rear thereof for attaching strain relief portion 14 to connector body portion 12 as will be described more fully hereinafter.

Figures 2, 2A, 3:
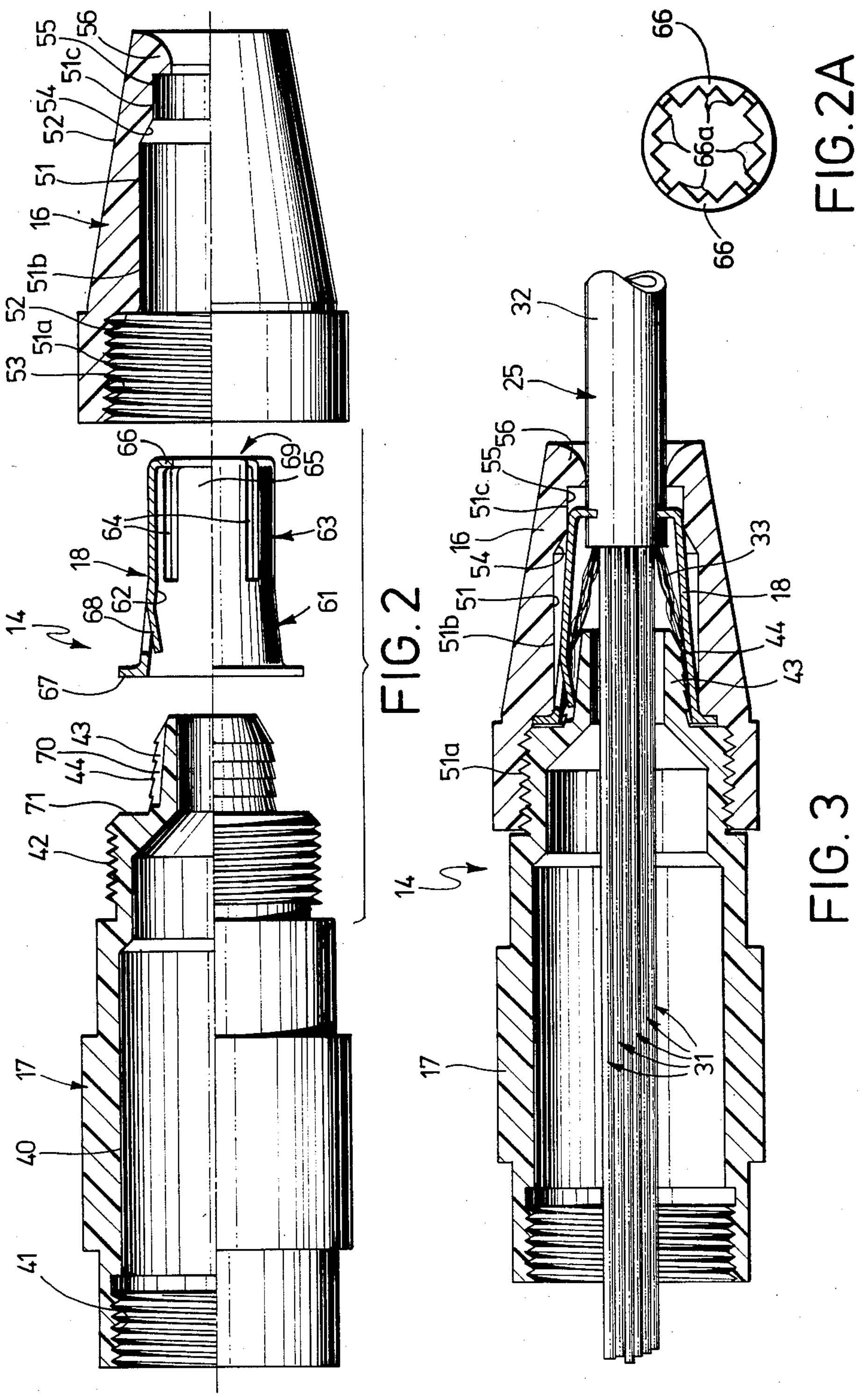
FIG. 2 is an exploded view, partially in cross-section, of the strain relief assembly of the connector of FIG. 1.
FIG. 2A is an end elevation view of a retention sleeve portion of the assembly shown in FIG. 2.
FIG. 3 is an assembled, cross-sectional view of the strain relief assembly of FIGS. 1 and 2.

With reference to FIGS. 1–3, strain relief portion 14 comprises a first annular retention member 16, a second annular retention member 17 and an annular retention sleeve 18. As will be described hereinafter, strain relief portion 14 comprises an assembly which is adapted to be attached to connector body portion 12 and to cable 25 to secure the cable to the connector in a manner that provides strain relief for the individual optical fiber attachments in the connector.

Cable 25 contains a plurality of individual optical fibers 31, and includes a plurality of layers of material which surround and protect the plurality of optical fibers. In the embodiment illustrated and described herein, cable 25 includes an outer cover or jacket 32 of strong flexible plastic or the like and an inner strengthening layer 33 consisting of a large number of very fine threads of Kevlar or other suitable material. In addition, the individual fibers are provided with a coating or buffer layer 34 of plastic or the like which is applied directly to the surface of the fibers. Although in the embodiment described herein, cable 25 contains a plurality of optical fibers, it should be understood that connector 10 can be used to terminate cables containing one or more optical fibers as well as cables containing both optical fibers and electrical conductor wires.

First annular retention member 16 comprises a rigid, generally conical-shaped member having an axial passageway 51. Passageway 51 includes a front passageway portion **51*a* having a threaded surface 53, an intermediate passageway portion 51*b* of somewhat reduced diameter, and a reduced rear diameter passageway portion 51*c* which includes a tapered portion 54 and a cylindrical portion 55. Passageway portions 51*a* and 51*b* define a radially extending annular shoulder 52 therebetween. As will be described hereinafter, the peripheral surface of passageway portion 51*c* comprises a first bearing surface adapted to cooperate with a jacket retention portion on annular retention sleeve 18 to attach jacket 32 of cable 25 to connector 10**.

First annular retention member 16 further includes an annular, inwardly extending flange 56 adjacent the rear end thereof.

Second annular retention member 17 comprises a rigid, generally cylindrical-shaped member having an axial passageway 40. Second annular retention member 17 includes a first, internally threaded surface portion 41 in passageway 40 adjacent the front end thereof, and a second, externally threaded surface portion 42 toward the rear end thereof. In addition, second annular retention member 17 includes a rearwardly extending portion 43 having a tapered outer surface 44. Surface 44 preferably comprises a serrated surface. As will be explained hereinafter, tapered surface 44 comprises a second bearing surface adapted to cooperate with a strengthening layer retention portion on annular retention sleeve 18 to attach strengthening layer 33 of cable 25 to connector 10.

Annular retention sleeve 18 comprises a somewhat flexible, generally tubular-shaped member of metal or plastic. Annular sleeve 18 has a front tapered portion 61 defining a tapered internal retention surface 62, and a rear, cylindrical portion 63. As will be described hereinafter, front, tapered portion 61 comprises a strengthening layer retention portion adapted to cooperate with second bearing surface 44 on second annular retention member 17 to attach strengthening layer 33 of cable 25 to connector 10; and rear, cylindrical portion 63 comprises a jacket retention portion adapted to cooperate with first bearing surface **51*c* on first annular retention member 16 to attach the cable jacket 32 to connector 10**.

Rear portion 63 of sleeve 18 includes a plurality of longitudinal slots 64 extending forwardly from rear end 69 thereof. Slots 64 define a plurality of resilient portions 65 therebetween having inwardly extending fingers 66 at the rear ends thereof. The fingers 66 have radially inward pointed, triangular teeth **66*a*, as shown in FIG. 2A. Annular sleeve 18 also includes an outwardly extending, annular flange 67** adjacent its front end.

To assemble connector 10, cable 25 is first prepared by removing a length of outer jacket 32 to expose strengthening layer 33 therein. A lesser portion of the strengthening layer is then trimmed away to expose the optical fibers 31. First annular retention member 16 and then annular retention sleeve 18 are slid over the end of cable 25, and over the end of jacket 32 such that the optical fibers 31 and strengthening layer 33 extend through axial passageway 51 in first annular retention member 16 through annular sleeve 18, respectively. Following assembly of strain relief portion 14 as described below, the fibers 31 are terminated by termination members 23, and secured in connector body portion 12. The second retention member 17 is then attached to connector body portion 12 by threading surface portion 41 onto threaded portion 42 of the housing portion.

The optical fibers 31 are extended through axial passageway 40 in second annular retention member 17. The exposed length of strengthening layer 33 is fanned out over tapered retention surface 44 of member 17. The ring or retention sleeve 18 is assembled onto the tapered surface 44 with the finger 68 along the groove 70, and the interior of the ring 18 stops against the surface 44 when the ring is partially assembled on the surface 44. The first annular retention member 16 is slid forwardly and attached to second annular retention member 17 by threading the internally threaded surface 53 of the first annular retention member onto the externally threaded surface 42 of the second annular retention member.

As the first and second annular retention members 16 and 17 are threaded together with annular retention sleeve 18 positioned therebetween, tapered portion 43 of second annular retention member 17 moves into annular retention sleeve 18. As it does so, second bearing surface 44 on tapered portion 43 presses against inner tapered surface 62 on tapered portion 61 of sleeve 18 and squeezes the fanned out strengthening layer 33 therebetween with an increasingly greater force. When members 16 and 17 are fully attached, the strengthening layer will be tightly squeezed between surfaces 44 and 62 and firmly retained therebetween as shown in FIGS. 1 and 3. The roughened nature of serrated surface 44 ensures that the strengthening layer will be tightly held between surfaces 44 and 62 without slippage.

As tapered portion 43 extends into sleeve 18, during connection of members 16 and 17 an inwardly extending finger 68 on sleeve 18 within a longitudinal groove 70 in surface 44 prevents relative rotation between the sleeve and second annular retention member during assembly.

As annular retention members 16 and 17 are threaded together, annular shoulder 52 on first retention member 16 engages flange 67 on annular retention sleeve 18 while pushing sleeve 18 farther into passageway 51 of first annular retention member 16. Cylindrical portion 63 of sleeve 18 is pushed into passageway portion **51*c* of annular retention member 16, and as it enters passageway portion 51***c*, the first bearing surface defined by the peripheral surface of portions 54 and 55 of passageway portion 51*c* engages resilient portions 65 of sleeve 18 and pushes fingers 66 inwardly and into contact with the outer jacket 32 of cable 25. When retention members 16 and 17 are fully secured together, fingers 66 are pressed into and against jacket 32 to firmly and reliably secure the cable jacket to strain relief structure 14.

When connector 10 is fully assembled as shown in FIG. 1, both outer jacket 32 and strengthening layer 33 of cable 25 are firmly and independently secured to the connector. The individual optical fibers 31 pass freely through strain relief portion 14 and into connector body portion 12.

Connector 10 can be assembled by relatively unskilled personnel without special tools, and provides effective strain relief for any number of optical fibers and/or electrical conductors in a cable. The strain relief portion 14 comprises an assembly which functions as an extension of connector body 12 and is simply threaded onto the rear end of connector body 12 avoiding the necessity of completely redesigning the connector body.

While what has been described constitutes a presently most preferred embodiment of the invention, it should be understood that the invention can take numerous other forms. Accordingly, the invention should be limited only insofar as is required by the scope of the following claims.

We claim:

1. In a connector for optical fiber cable having an outer jacket encircling a strengthening layer, in turn, encircling optical fibers, the connector comprising, a connector body portion and a strain relief portion for connection to the connector body portion, the strain relief portion including, a first retention member, a second retention member and sleeve means for retention of the strengthening layer of the cable between the sleeve means and the second retention member, the sleeve means being urged by the first retention member against the outer jacket of the cable for retention of the outer jacket, the improvement comprising;

the second retention member includes axially extending bearing surface means for entering radially under a strengthening layer of an optical cable, the sleeve means includes integral first internal retention means for advancement axially over the bearing surface means and for radially overlying and retaining a portion of a strengthening layer of an optical fiber cable extending through the sleeve means and for radially compressing the strengthening layer between the first internal retention means and the bearing surface means, the first retention member being constructed for advancement axially over the sleeve means during advancement of the first internal retention means axially over the bearing surface means, connecting means on the first and the second retention members for advancing the first retention member axially over the sleeve means during connection of the first retention member to the second retention member and during advancement of the first internal retention means axially over the bearing surface means, the sleeve means includes integral second internal retention means for overlying and retaining an outer jacket of an optical fiber cable, and the first retention member includes urging means responsive to advancing of the first retention member axially over the sleeve means for urging the second internal retention means into engagement with an outer jacket of an optical cable extending through the sleeve means.

2. In a connector as recited in claim 1, the improvement further comprising; a passageway extending axially in the first retention member for receiving the sleeve means, and a rear passageway portion of the passageway containing the urging means.

3. In a connector as recited in claim 2, the improvement further comprising;

the urging means is a peripheral surface on a reduced diameter tapered portion of the rear passageway portion and on a reduced diameter cylindrical portion of the rear passageway portion.

4. In a connector as recited in claim 1, the improvement further comprising;

the connecting means comprises complementary threaded surfaces on the corresponding first and second retention members.

5. In a connector as recited in claim 1, the improvement further comprising;

the first internal retention means comprises an internal surface of the sleeve means.

6. In a connector as recited in claim 1, the improvement further comprising;

the second internal retention means comprises axially extending fingers at a rear end of the sleeve means, the fingers being constructed for radial deflection by the urging means to engage an outer jacket of an optical cable extending through the sleeve menas.

7. In a connector as recited in claim 1, the improvement further comprising;

the bearing surface means and the first internal retention means are complementary tapered surfaces on the second retention member and the sleeve means, respectively.

* * * * *